UNITED STATES PATENT OFFICE.

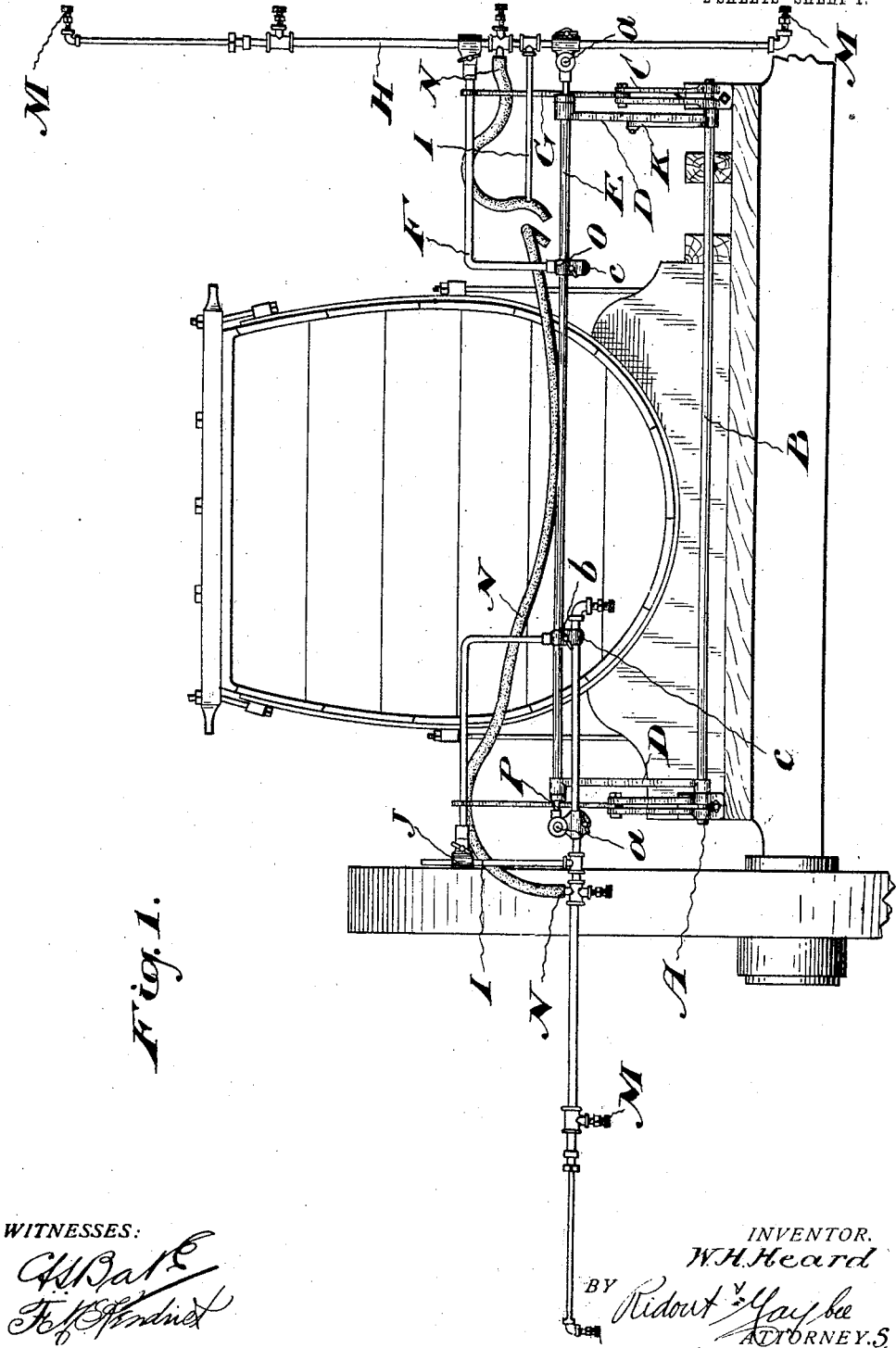

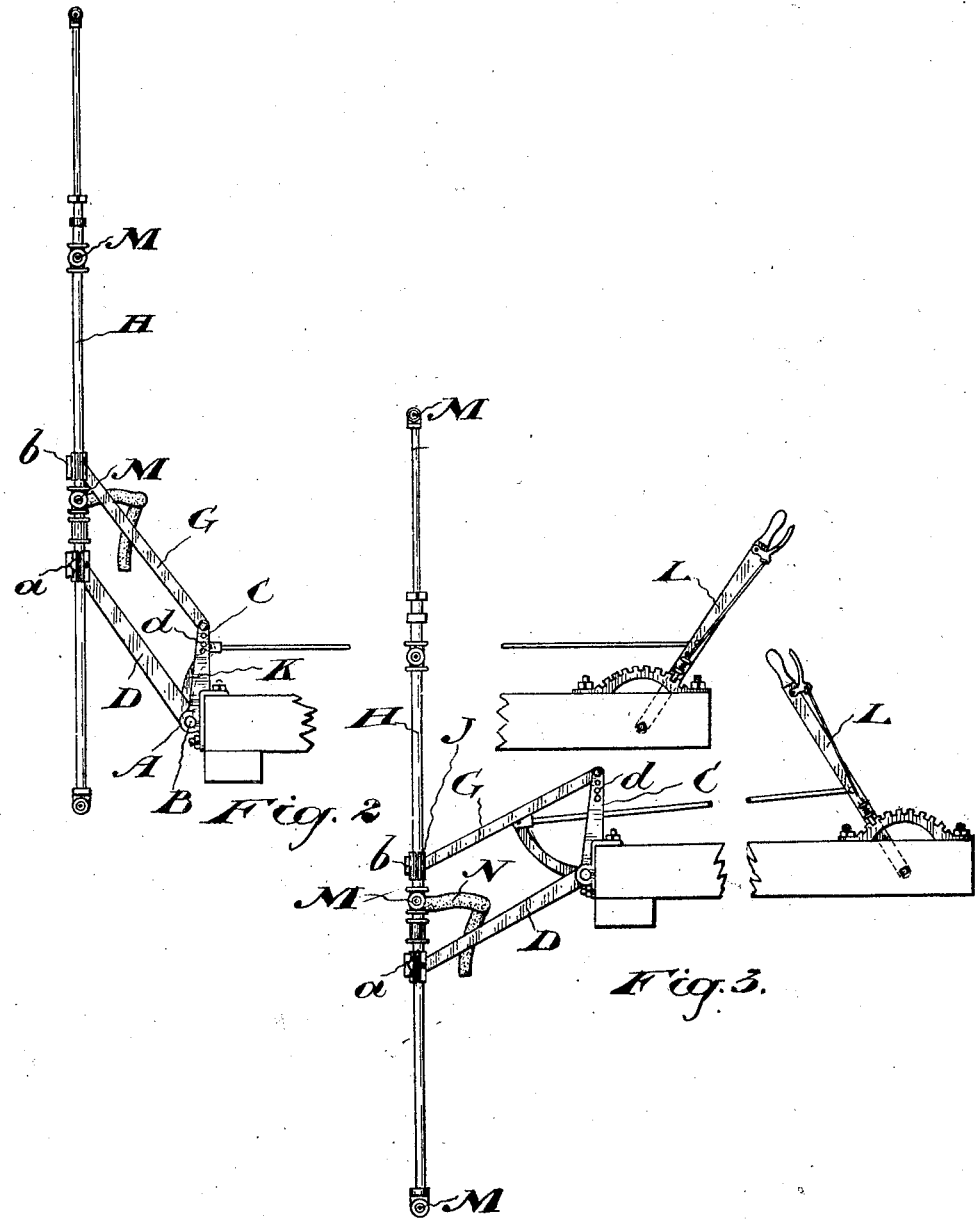

WILLIAM HENRY HEARD, OF LONDON, ONTARIO, CANADA.

SPRAYING APPARATUS.

No. 872,654.　　　　　Specification of Letters Patent.　　　　　Patented Dec. 3, 1907.

Application filed July 11, 1906. Serial No. 325,608.

*To all whom it may concern:*

Be it known that I, WILLIAM H. HEARD, of the city of London, in the county of Middlesex, Province of Ontario, Canada, have invented certain new and useful Improvements in Spraying Apparatus, of which the following is a specification.

My invention relates to sprayers of the class in which the spray nozzles are carried by a cart or other vehicle and are arranged to sprinkle rows of plants, vines or bushes.

My object is to arrange such apparatus so that it may be quickly changed from an ordinary row sprayer to a vineyard sprayer and vice versa and so that the sprays may be delivered at any desirable height and my invention consists essentially of the constructions hereinafter more specifically described and then definitely claimed.

Figure 1 is a rear elevation of the apparatus. Figs. 2 and 3 are side elevations showing the apparatus in two different positions.

In the drawings like letters of reference indicate corresponding parts in the different figures.

A are brackets bolted on the ends of the side sills of the vehicle. Journaled in these brackets is a cross bar B. Extending upwardly from each bracket is an arm C. Secured to the cross bar B at opposite ends are the links D. The outer ends of these links are pivotally connected with the horizontal bar E.

F are two L-shaped bars each having one arm clamped to the horizontal bar E and having its other arm horizontal and lying substantially in the same vertical plane as the said horizontal bar. Links G are pivotally connected with the horizontal parts of these L-shaped bars and with the arms C.

H are spray conduits each hinged at *a* at one end of the horizontal bar E. The hinges are preferably intermediate of the ends of the conduits.

Rigidly secured to each spray conduit is a stem I substantially at right angles to the conduit.

The outer end of each L-shaped bar F is provided with a clamp J. This clamp may be engaged either with the conduit as shown at the right hand in Fig. 1, or with one of the stems I as shown at the left hand in Fig. 1. It will be seen that in any case rigid connections are formed between the ends of the horizontal bar E and the horizontal parts of the L-shaped frames. From this it follows that the horizontal bar, the L-shaped bars and the conduits or the stems form a frame vertically movable with what is commonly known as a parallel motion by means of the links D and G.

Motion is imparted to the parts by means of the arm K preferably formed integral with or rigidly connected to one of the links D. This arm is connected in the ordinary manner with a suitable adjustable hand lever L of ordinary type by means of which the arm may be rocked and held as adjusted.

The spray conduits are provided with a series of spray nozzles M. Each conduit has a hose N connected therewith through which the conduit may be supplied with a spraying mixture.

It will be noted that the clamps O which secure the L-shaped bars to the horizontal bar are split and provided with thumb screws *b*. Thus the clamps may be laterally adjusted on the horizontal bar to vary the width apart of the clamps at their outer ends.

Instead of hinging the spray conduits directly on the ends of the horizontal bar I prefer to hinge them on rods P telescoped within the horizontal bar. Thus the spray conduits may be laterally adjusted to suit the width between the rows with which they are employed. The ends of the spray conduit are also preferably of telescopic construction, but this is an old arrangement and need not be particularly described.

In spraying vineyards both conduits will be set in the position shown at the right hand of Fig. 1. When spraying low rows such as potatoes both conduits will be set in the position shown at left hand in Fig. 1. In either position the conduits are vertically adjustable by means of the parallel motion already described, though the advantage of the parallel motion is mostly observed when the spray conduits are set vertically for vineyard spraying as in this case the conduit may be adjusted to any desired height without throwing it out of the vertical, which is an important advantage in vineyard spraying.

As an additional security when the spray conduits are in the horizontal position I provide the clamps O with jaws *c* adapted to receive the conduit as shown at the left hand in Fig. 1. When the thumb screws *b* are screwed up the conduits are rigidly held to the horizontal bar.

It will be noted on reference to Figs. 1 and 2 that I provide one or more holes $d$ in the arm C by which the links may be adjusted up and down enabling me to use the same brackets A with L-shaped bars F of a varying distance from the horizontal bar E.

It will be seen that, as the whole of the apparatus is supported from the brackets A, by detaching the brackets the whole apparatus may be lifted from the vehicle and any other form of spray apparatus substituted.

What I claim as my invention is:—

1. In spraying apparatus the combination of a vehicle; two independent conduits transversely hinged thereon and each capable as a whole of occupying either a vertical or horizontal position; a plurality of spray nozzles carried thereby; means for holding said conduits either horizontal or vertical, the parts being so proportioned and arranged that the conduits when horizontal will spray a plurality of substantially equidistant rows; means for laterally and separately adjusting each spray conduit in either position; and means for vertically and simultaneously adjusting both conduits in either position, substantially as described.

2. In spraying apparatus the combination of a vehicle; two independent conduits transversely hinged thereon and each capable as a whole of occupying either a vertical or horizontal position; a plurality of spray nozzles carried thereby; means for holding said conduits either horizontal or vertical, the parts being so proportioned and arranged that the conduits when horizontal will spray a plurality of substantially equidistant rows; and means for vertically and simultaneously adjusting both conduits in either position, substantially as described.

3. In spraying apparatus the combination of a vehicle; a vertical transverse frame supported therefrom; a spray conduit hinged at the lower part of the frame: means for clamping the conduit to the lower part of the frame when the conduit is horizontal; a stem secured to the conduit at right angles thereto; and means for clamping either the conduit or said stem to the upper part of the frame, substantially as described.

4. In spraying apparatus the combination of a vehicle; a vertical transverse frame supported therefrom; a spray conduit hinged at the lower part of the frame; means for clamping the conduit to the lower part of the frame when the conduit is horizontal; a stem secured to the conduit at right angles thereto; and means for clamping either the conduit or said stem to the upper part of the frame and two parallel links pivoted respectively to the top and bottom of the frame and at their other ends to the vehicle, substantially as described.

5. In a spraying apparatus the combination of a vehicle; a frame; a spray conduit rigidly carried thereby; and two pairs of parallel links, the links of each pair being each pivoted on the vehicle and on said frame, substantially as described.

6. In a spraying apparatus the combination of a vehicle; a horizontal bar; links pivoted on the bar and to the vehicle; L-shaped bars one at each side of the apparatus each having one arm secured to the horizontal bar and the other arm horizontal and in substantially the same vertical plane as the said horizontal bar; links each pivotally connected to the horizontal part of one of the L-shaped bars and to the vehicle; and spray conduits connected to both the horizontal bar and the horizontal parts of the L-shaped bar, substantially as described.

7. In a spraying apparatus the combination of a vehicle; a horizontal bar; links pivoted on the bar near its end to the vehicle; L-shaped bars one at each side of the apparatus each having one arm secured to the horizontal bar and the other arm horizontal and in substantially the same vertical plane as the said horizontal bar; links each pivotally connected to the horizontal part of one of the L-shaped bars and to the vehicle; spray conduits hinged at the ends of the horizontal bar; a stem at right angles to each conduit; and clamps on the horizontal parts of the L-shaped bars adapted to engage and hold either the spray conduits or the stems, substantially as described.

8. In spraying apparatus the combination of a vehicle; a horizontal telescopic bar; links pivoted on the bar near its ends and to the vehicle; L-shaped bars one at each side of the apparatus each having one arm adjustably secured to the horizontal bar and the other arm horizontal and in substantially the same vertical plane as the said horizontal bar; links each pivotally connected to the horizontal part of one of the L-shaped bars and to the vehicle and spray conduits connected to both the horizontal bar and the horizontal parts of the L-shaped bar, substantially as described.

9. In spraying apparatus the combination of a vehicle; two brackets detachably secured to the rear thereof; a frame; spray conduits carried thereby; and two sets of parallel links each pivotally connected with one of the said brackets and with the said frame, substantially as described.

10. In a spraying apparatus the combination of a vehicle; a frame; two pairs of parallel links, the links of each pair being each pivoted on the vehicle and on said frame; a spray conduit hinged on said frame; and means for holding said conduit either horizontal or vertical, substantially as described.

June 22nd 1906.

WILLIAM HENRY HEARD.

Signed in the presence of—
  J. W. S. WINNETT,
  R. E. WALKER.